US012769938B2

(12) United States Patent
M. et al.

(10) Patent No.: US 12,769,938 B2
(45) Date of Patent: Oct. 20, 2026

(54) LARGE LANGUAGE MODEL CONTEXT CONCRETIZER

(71) Applicant: Wells Fargo Bank, N.A., San Francisco, CA (US)

(72) Inventors: Sivakumar M., Bangalore (IN); Govinda Rajulu Nelluri, Hyderabad (IN); Vinay K. Pandey, Hyderabad (IN)

(73) Assignee: Wells Fargo Bank, N.A., San Francisco, CA (US)

( * ) Notice: Subject to any disclaimer, the term of this patent is extended or adjusted under 35 U.S.C. 154(b) by 145 days.

(21) Appl. No.: 18/890,467

(22) Filed: Sep. 19, 2024

(65) Prior Publication Data

US 2026/0080051 A1 Mar. 19, 2026

(51) Int. Cl.

| | |
|---|---|
| ***G06F 40/30*** | (2020.01) |
| ***G06F 21/50*** | (2013.01) |
| ***G06F 40/20*** | (2020.01) |

(52) U.S. Cl.

CPC .............. *G06F 40/20* (2020.01); *G06F 21/50* (2013.01); *G06F 40/30* (2020.01)

(58) Field of Classification Search

None

See application file for complete search history.

(56) References Cited

U.S. PATENT DOCUMENTS

| | | | |
|---|---|---|---|
| 7,853,445 B2 | 12/2010 | Bachenko et al. | |
| 9,292,493 B2 | 3/2016 | Chandramouli et al. | |
| 11,755,743 B2 | 9/2023 | Sharma et al. | |
| 11,875,130 B1 | 1/2024 | Bosnjakovic et al. | |
| 11,977,854 B2 | 5/2024 | Tunstall-Pedoe et al. | |
| 2023/0146979 A1 | 5/2023 | Gunasekara et al. | |
| 2023/0370476 A1 | 11/2023 | Bakshi et al. | |
| 2023/0385790 A1 | 11/2023 | Rahnama | |
| 2024/0296279 A1* | 9/2024 | Gardner | G06F 16/3329 |

(Continued)

FOREIGN PATENT DOCUMENTS

| | | | |
|---|---|---|---|
| CN | 117371940 | A | 1/2024 |
| CN | 117390409 | A | 1/2024 |

(Continued)

OTHER PUBLICATIONS

Chen, Guangyi, et al. "Self-critical attention learning for person re-identification." Proceedings of the IEEE/CVF international conference on computer vision. 2019. (Year: 2019).*

(Continued)

*Primary Examiner* — Douglas Godbold
(74) *Attorney, Agent, or Firm* — Merchant & Gould P.C.

(57) ABSTRACT

An example computer system for determining jailbreak attempts comprises: one or more processors; and non-transitory computer-readable storage media encoding instructions which, when executed by the one or more processors, causes the computer system to: receive a query sequence from a client device; determine a context of the query sequence; responsive to a determination the context of the query sequence is the associated context: provide the query sequence to a context concretizer, wherein the context concretizer is configured to process query sequences that include an associated context; determine, by the context concretizer, whether the query sequence includes a jailbreak attempt for the associated context; and responsive to a second determination that the query sequence includes the jailbreak attempt, provide an error response to the client device.

18 Claims, 7 Drawing Sheets

(56) References Cited

U.S. PATENT DOCUMENTS

| | | | | |
|---|---|---|---|---|
| 2025/0181679 | A1* | 6/2025 | Oz | G06F 21/121 |
| 2025/0348580 | A1* | 11/2025 | Galinkin | G06F 40/284 |
| 2025/0348583 | A1* | 11/2025 | Lu | G06F 21/56 |
| 2025/0381494 | A1* | 12/2025 | Bright | A63H 3/36 |
| 2025/0384132 | A1* | 12/2025 | Fu | G06F 21/566 |
| 2025/0384145 | A1* | 12/2025 | Panda | G06F 21/577 |
| 2026/0017384 | A1* | 1/2026 | Halder | G06F 21/577 |
| 2026/0017386 | A1* | 1/2026 | Ohayon | G06F 21/577 |
| 2026/0058997 | A1* | 2/2026 | Qureshi | H04L 63/20 |
| 2026/0065172 | A1* | 3/2026 | Mohanty | G06N 20/20 |

FOREIGN PATENT DOCUMENTS

| | | | |
|---|---|---|---|
| CN | 117520503 | A | 2/2024 |
| CN | 117932086 | A | 4/2024 |
| WO | 2024091682 | A1 | 5/2024 |

OTHER PUBLICATIONS

Jain, Neel, et al. "Baseline defenses for adversarial attacks against aligned language models." arXiv preprint arXiv:2309.00614 (2023). (Year: 2023).*

Bai, Yuzhe, et al. "Enhancing network attack detection accuracy through the integration of large language models and synchronized attention mechanism." Applied Sciences 14.9 (2024): 3829. (Year: 2024).*

Yifanc Yao et al., A survey on large language model (LLM) security and privacy: The Good, The Bad, and The Ugly, High-Confidence Computing, Mar. 1, 2024, p. 1-21, vol. 4, Issue 2, ScienceDirect, https://www.sciencedirect.com/science/article/pii/S266729522400014X?ref=pdf_download&fr=RR-2&rr=8c5152c50942bfc5#d1e2030.

* cited by examiner

LARGE LANGUAGE MODEL CONTEXT CONCRETIZER

BACKGROUND

Large Language Models (LLMs) have grown in popularity. These models are used to make generative artificial intelligence (AI), which can be used to generate human-like text. For example, a question can be submitted to an LLM, and the LLM provides an output that seems like human output and answers the question. The LLM can generate documents, pictures, and videos among other things. While providing impressive generation capabilities, LLMs can be used for malicious purposes. The complexity of the LLMs allows offenders to input crafted text that causes the LLM to output dangerous information despite safeguards being in place. For example, a malicious user may seek information such as how to make a bomb or hack a secure system.

SUMMARY

Examples provided herein are directed to a Large Language Model context concretizer.

According to one aspect, a computer system for determining jailbreak attempts comprises: one or more processors; and non-transitory computer-readable storage media encoding instructions which, when executed by the one or more processors, causes the computer system to: receive a query sequence from a client device; determine a context of the query sequence; responsive to a determination the context of the query sequence is the associated context: provide the query sequence to a context concretizer, wherein the context concretizer is configured to process query sequences that include an associated context; determine, by the context concretizer, whether the query sequence includes a jailbreak attempt for the associated context; and responsive to a second determination that the query sequence includes the jailbreak attempt, provide an error response to the client device.

According to an additional aspect, a method for determining jailbreak attempts comprises: receiving a query sequence from a client device; determining a context of the query sequence; responsive to a determination the context of the query sequence is the associated context: providing the query sequence to a context concretizer, wherein the context concretizer is configured to process query sequences that include an associated context; determining, by the context concretizer, whether the query sequence includes a jailbreak attempt for the associated context; and responsive to a second determination that the query sequence includes the jailbreak attempt, providing an error response to the client device.

The details of one or more techniques are set forth in the accompanying drawings and the description below. Other features, objects, and advantages of these techniques will be apparent from the description, drawings, and claims.

DETAILED DESCRIPTION

Figure 1:
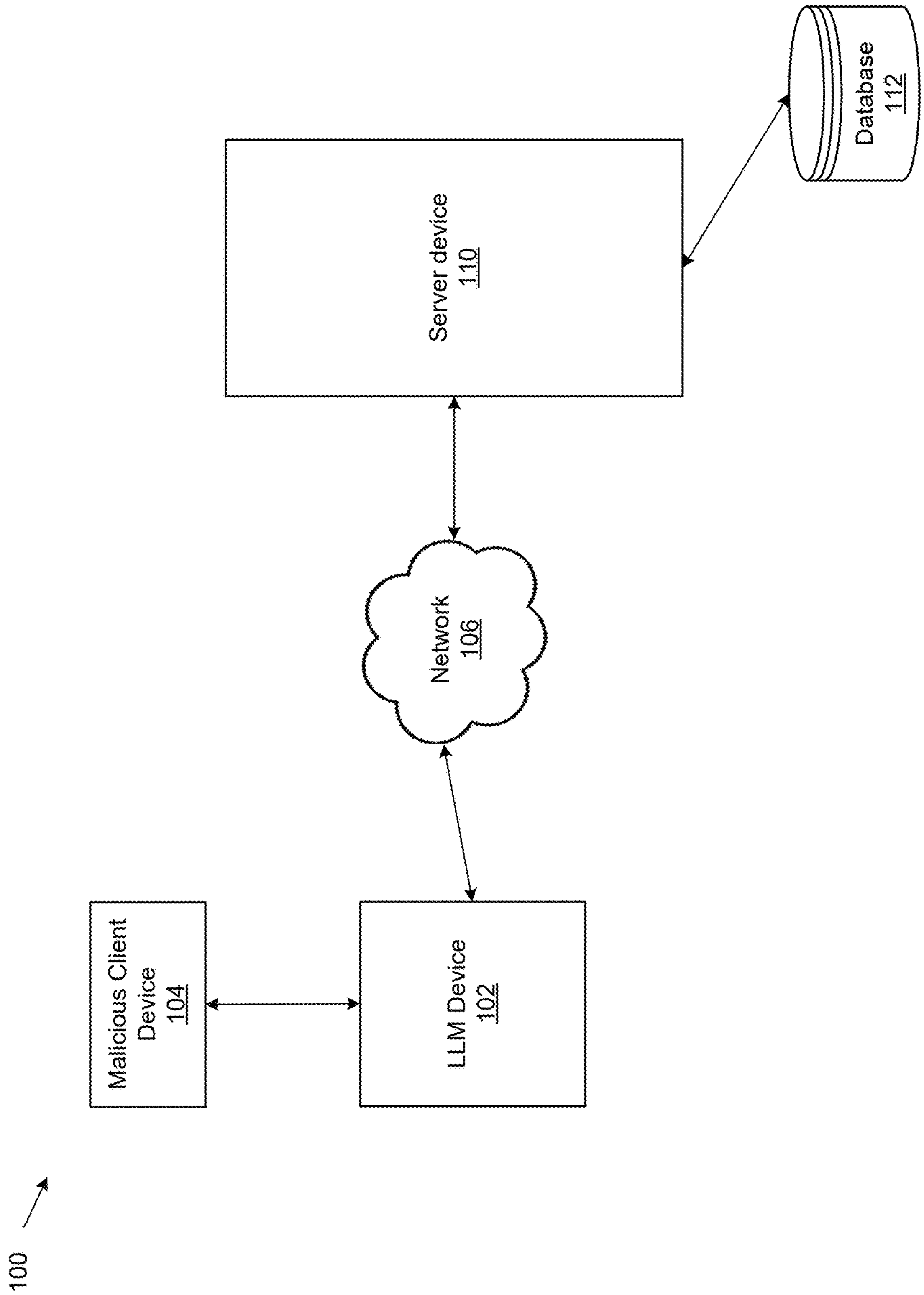
FIG. 1 shows an example system for preventing jailbreak attempts of an LLM.

This disclosure relates to a Large Language Model (LLM) context concretizer.

An LLM is a type of artificial intelligence designed to understand and generate human-like text. These models are trained on massive datasets of text and code, allowing them to perform a variety of natural language processing tasks. A concern for many industries is grappling with a surge in jailbreak requests across various LLMs. A jailbreak request, in the context of LLMs, is an attempt to provide a query that circumvents the installed safeguards of an LLM and trick the LLM to provide dangerous information, such as how to hack a computer system, make a bomb, or access secure data.

For example, malicious users may attempt to obtain information to hack a financial institution using an LLM. These offenders carefully craft their query to overcome any safeguards to cause the LLM to produce the desired information even though there are different AI alignment activities implemented across the AI industry to prevent these attacks. These unexpected disruptions in security have raised significant concerns.

Examples of breakdowns of LLMs resulting from jailbreak attempts include linguistic evasion, algorithmic overreach, model misinterpretation, and privacy breach. A linguistic evasion occurs where some LLMs exhibit a concerning ability to bypass linguistic filters, enabling them to generate misleading or fraudulent content that poses risks to financial institutions' communication systems. An algorithmic overreach occurs where LLM algorithms demonstrate an unexpected overreach, causing unintended consequences in financial decision-making processes. This poses a serious challenge to maintaining algorithmic integrity.

Further, model misinterpretation issues occur where LLMs occasionally misinterpret market signals, leading to flawed predictions and investment decisions. This flaw can result in substantial financial losses for those relying on the accuracy of these models. Also, many LLMs have shown vulnerabilities leading to data privacy breaches of the data used to train the LLM.

Accordingly, described embodiments that include the context concretizer can address these issues. The context concretizer is a context provider that is incorporated into an LLM and is better trained to handle specific contexts that are detected in submitted queries to the LLM. The context concretizer funnels queries with specified contexts, such as queries pertaining to the financial industry, and scans the query for potential breakdown/jailbreak attempts. Further, the context concretizer is configured for a specific industry or context so to limit the complexity of programming and/or training of the concretizer. The context concretizer is also easier to implement into existing LLMs, such as ChatGPT, Gemini, Claude, etc., based on the limited scenarios the concretizer is used.

In some embodiments, the LLM also includes an alignment award function. The alignment award function rewards the LLM when it prevents a jailbreak query, thus, supporting the LLMs functions of not providing answers to questions seeking information for destructive purposes. Using this function, the alignment award function uses the rewards as a catalyst to stop alignment issues or recover from alignment issues that may cause the LLM to perform unexpectedly.

The context concretizer may need to be updated. In some embodiments, a context destructor signals to the LLM when a context has completely changed for a specific LLM build. Destructing context of the LLM helps prevent LLM hallucination using the old context that is no longer relevant or has known security flaws.

FIG. 1 illustrates an example system 100 for deploying a context concretizer to LLMs. The system 100 includes a LLM device 102 that connects through a network 106 to a server device 110. The server device 110 also connects to a database 112. Further, a malicious client device 104 connects to the LLM device 102.

Each of the devices may be implemented as one or more computing devices with at least one processor and memory. Example computing devices include a mobile computer, a desktop computer, a server computer, or other computing device or devices such as a server farm or cloud computing used to generate or receive data. In some embodiments, each of the devices may be distributed across multiple computing devices to form a system.

In some non-limiting examples, the server device 110 is owned by a financial institution, such as a bank. The LLM device 102 can be programmed to communicate with the server device 110 to perform various tasks. Many other configurations are possible, and the disclosure is not limitation to the financial industry.

The LLM device 102 operates machine learning models that are stored within the LLM device 102. The machine learning model may be an LLM that produces text generation, video generation, or audio generation. For example, the LLM device 102 may receive a request to answer a query from a client device. The request is also known as a query or a query sequence. A query includes a query sequence that is processed by the LLM device 102. The LLM device 102 then provides a human-like response to the question. Using the capabilities of the LLM, the LLM device 102's response is also highly accurate and relevant to the provided question. In some embodiments, the LLM device 102 also generates documents upon the request. For example, the LLM device 102 can provide a full email that is well written and includes any information provided in the request to the LLM device 102.

Due to its impressive capabilities of providing accurate information, many malicious entities attempt to jailbreak the LLM device 102 in order to gain access to information that can be used to accomplish corrupt or illegal tasks. For example, the LLM device 102 may receive a request from the malicious client device 104 to provide a method to hack a financial institution or leak financial data. While a normal query can be easily filtered and denied, the malicious client device 104 provides a carefully crafted query to cause the LLM device 102 to provide the desired information despite safeguards being in place.

For example, the malicious client device 104 may submit a query to the LLM device 102 that includes a story about how the user's grandparent used to tell bedtime stories about how to hack a financial institution and asks the LLM to craft such a storying including the illicit information about the hacking. Not knowing the user is intending to obtain dangerous information due to the added context, the LLM device 102 provides the response to the user. In some embodiments, the query includes a request to hack the server device 110.

To combat these jailbreak attempts, the LLM device 102 is configured to process requests related to certain contexts, areas, or industries with specialized components. Rather than process the requests as normal queries, the LLM device 102 processes such queries with a context concretizer that is specifically programmed to handle contexts for the specified context. The LLM device 102 then has better analysis capabilities to identify jailbreak attempts. By separating processing of queries by determined context, the LLM device 102 can provide the query to the correct logical component for processing and identification of intent. If the query is determined to be a jailbreak attempt, the query can be intercepted and stopped (e.g., provided with an error response) rather than the desired information.

The server device 110 generates the context concretizer and provides the context concretizer to various LLMs. For example, the server device 110 may be owned by the financial institution that seeks to protect its infrastructure and data from hacking. Rather than relying on the LLM developer that likely lacks additional details and information about the entity's financial system, the server device 110 can generate the context concretizer for installation to the LLM.

Further, the server device 110 is configured to generate a context concretizer for different LLMs. For example, the LLM Claude and the LLM ChatGPT include different structures and design. Accordingly, the server device 110 generates the context concretizer to be compatible with a specified LLM. In addition, the server device 110 can adjust the context concretizer to be incorporated into the selected LLM and still perform the same or similar functions.

In some embodiments, the server device 110 also updates the context concretizer while it is injected into the LLM device 102. As updates need to be made to address possible vulnerabilities discovered in the LLM device 102. Accordingly, the LLM device 102 needs to be retrained so that the LLM device 102 does not hallucinate from relying old training data that was provided as part of the context concretizer. As more vulnerabilities of the LLM device 102, the LLM device 102 can be quickly updated and retrained to become more secure.

The database 112 stores data used for generating the context concretizer. In some embodiments, the data includes user account data, query data, and other training data. In additional embodiments, the database stores a plurality of context concretizers for various LLM models.

Figure 2:
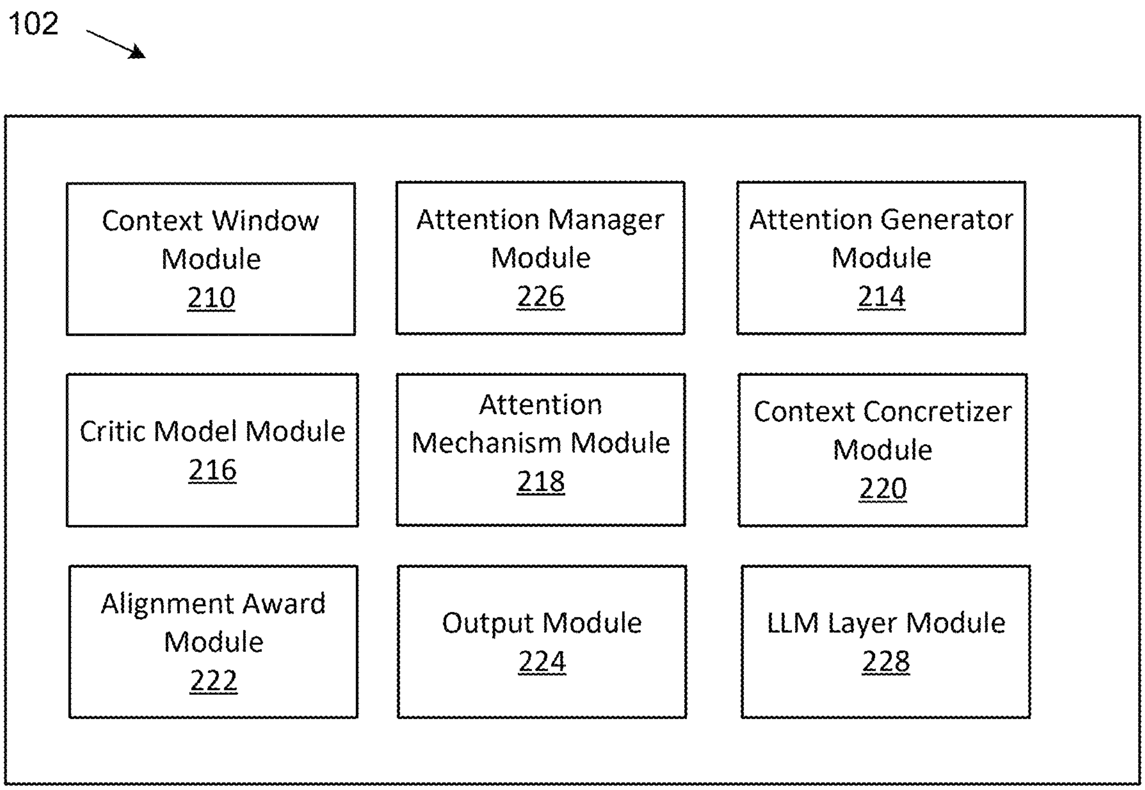
FIG. 2 shows example logical components of a LLM device of the system of FIG. 1.

FIG. 2 illustrates logical components of the LLM device 102 of the system 100. In this embodiment, the LLM device 102 includes a context window module 210, an attention manager module 226, an attention generator module 214, a critic model module 216, an attention mechanism module 218, a context concretizer module 220, an alignment award module 222, an output module 224, an attention manager module 226, and a LLM layer module 228.

The context window module 210 is configured to receive queries for processing and partition the query into different windows for processing. Further, the context window module 210 converts the words within the query into tokens that are processed by the LLM device 102. The context window module 210 also includes a maximum amount of text the model can consider at once when processing or generating output. In addition, the context window module 210 allows the LLM device 102 to understand the relationships between words and phrases within the received query by separating the tokens of the query search.

The context window module 210 also converts the received words of the query into tokens. Tokens are the fundamental units of text that the model processes and understands. Many LLMs work with a finite vocabulary of tokens they have been trained on. Breaking down text into tokens helps the model handle a wider range of words and language constructs efficiently. LLMs learn to understand the relationships and patterns between tokens. This enables them to capture the meaning and context of a piece of text, even if it contains rare words or complex sentence structures. LLMs process input text as a sequence of tokens, and they generate output by predicting the next token in the sequence based on the preceding context. In some embodiments, tokens represent each word. Tokens can represent sub words as well.

In some embodiments, a client device may send a query to the LLM device 102. The query may contain a question or request to generate a document. The context window module 210 receives the request and splits the query into different portions or windows. The windows generated by the context window module 210 may vary in size. Some windows may include a few hundred tokens while others may handle thousands of tokens. Once the query is divided into windows, the windows are passed to the attention manager module 226.

The attention manager module 226 is configured to manage the focus of the LLM device 102 on the important tokens of the query. The attention manager uses the attention generator module 214 and the critic model module 216 to determine how to process the window or query. For example, the attention manager module 226 may determine that the context of the window is in the selected industry of the context concretizer module 220, such as the financial industry. The attention manager module 226 also computes vectors for each token, such as a query, key, and value vectors, which are provided to either the attention mechanism module 218 or the context concretizer module 220. Accordingly, each token's computed vectors of the query are sent to the context concretizer module 220 or the attention mechanism module 218 for further processing and determination of the attention for the query.

In some embodiments, the attention manager module 226 determines the context of the query is outside the scope of the context concretizer module 220. Accordingly, the attention manager module 226 provides the query to the attention mechanism module 218, which is used for normal operation of the LLM device 102. In some embodiments, the attention manager module 226 provides the query to a different attention mechanism module not shown.

The attention generator module 214 and the critic model module 216 control the focus of the attention manager module 226 on tokens within the context window. The attention generator module 214 determines a potential context for the selected window. For example, the attention generator module 214 may determine that the phrase "sitting on a bank and looking at sand" likely means that the person is sitting on an ocean bank and not a financial institution.

The critic model module 216 reviews the determined context from the attention manager module 226. The critic model module 216 evaluates the determined context and provides a quality control mechanism. To evaluate the context, the critic model module 216 provides feedback to the attention generator module 214 in the form of scores, ratings, or even a detailed explanation.

For example, the critic model module 216 may offer an alternative context for "sitting on a bank and looking at sand." The critic model module 216 may offer a score of twenty percent that the statement relates to a financial institution, while the attention generator module 214 offers a score of eighty percent that the statement relates to the ocean. The attention manager module 226 then determines that the context of the query is likely ocean related and sends the query and associated context windows to the attention mechanism module 218 for further processing. In some embodiments, the query is sent to the context concretizer module 220 if the context is determined to be the associated context of the context concretizer module 220, such as the financial industry.

The attention mechanism module 218 receives the query and further draws the attention of the LLM processing to the most relevant parts of the submitted query. Focusing the attention enables the LLM device 102 to understand the meaning of the words within the query based on the surrounding context. In addition, attention can capture relationships between words that are far apart in a sentence. In some embodiments, many attention calculations can be performed simultaneously, making attention mechanisms computationally efficient for large models. Also, attention weights provide a glimpse into the model's reasoning, revealing which parts of the input it considers most important for a given task.

In some embodiments, the attention mechanism module 218 calculates weighted sums for each of the tokens in the query to determine which tokens are most important. These weighted scores are used when generating the output of the LLM device 102 that is provided to the end user. In some embodiments, the attention mechanism module 218 includes a scaled dot-product attention, a multi-head attention, and/or a self-attention type of attention mechanism.

Once the attention mechanism module 218 generates weighted sums or other forms of output, the output is provided to the LLM layer module 228 for further processing. In some embodiments, the output is provided to the output module 224. In some embodiments, the calculation of the weights is performed multiple times in parallel, each time with different linear projection of the previously determined vectors of queries, keys, and values. The attention mechanism module 218 then concatenates and linearly transforms each output of the parallel calculations to produce an output that is sent to the next layer of the LLM layer module 228.

In some embodiments, the attention mechanism module 218 is part of a self-attention layer that relies on calculating the queries vector, keys vector, and values vector. These each are used to calculate the attention the LLM device 102 should give to the associated token. In some embodiments, the attention mechanism module 218 captures dependencies in sequential data by assigning different importance weights to different steps for a time series analysis. In some embodiments, the attention mechanism module 218 helps the LLM device 102 understand the context of the query and the meaning of a sentence by highlighting the importance of different words and how they relate.

The context concretizer module 220 determines further context of a query in a specified industry. Further, the context concretizer module 220 is specifically designed and/or trained data pertaining to the desired context (such as a particular industry or subject). Further, the context concretizer module 220 adds additional weights that target jailbreak attempts. These additional weights are better tuned for detecting jailbreak attempts for the associated context, thus, enhancing security of the LLM device 102. In some embodiments, the context concretizer module 220 is also self-managed.

The context concretizer module 220 is more adapted to handle possible jailbreaks since it was generated by a device that was programmed with more expansive data and is targeted to a specific context/industry rather than being general purpose. Attempting to create safeguards that can be used for all industries often results in an imperfect solution since the general-purpose safeguards will not be adapted to handle targeted queries. The context concretizer module 220 addresses this issue by analyzing specific contexts that are related to a desired industry. In addition, the context concretizer module 220 includes added weights to identify potential jailbreaks rather than relying on specific LLM centric tech weights.

In some embodiments, the context concretizer module 220 is an additional layer that is provided by the server device 110. As the context concretizer module 220 receives vectors of the query from the attention manager module 226, the context concretizer module 220 determines if the query includes a jailbreak attempt. If the context concretizer module 220 determines the query is about the associated context but does not contain a jailbreak attempt. The context concretizer module 220 operates as the same or similar to the attention mechanism module 218. The context concretizer module 220 calculates weights for each token of the query to indicate which tokens the LLM device 102 should be given the most weight in generating the LLM device 102's output.

If the context concretizer module 220 determines the query is a likely jailbreak attempt, the context concretizer module 220 can intercept the intended output and provide an error output where the LLM device 102 indicates to the user that it cannot answer the query. For example, if the query was "how do I hack a financial institution", the context concretizer module 220 would determine the query is a jailbreak attempt and provide a response indicating the LLM device 102 cannot respond to that query. Accordingly, the context concretizer module redirects the LLM device 102 to prevent answers to malicious attacks on the LLM device 102 or other systems.

In some embodiments, the context concretizer module 220 is directed to a specific context, industry, or subject. The context concretizer module 220 reduces the expansive knowledge accessible by the LLM device 102 to a specific funnel so the context concretizer looks for jailbreaks or malicious queries regarding specific subjects or industries. In one example, the context concretizer module 220 is trained on malicious attacks regarding the financial industry.

The alignment award module 222 provides an award to the LLM device 102 for correctly identifying a jailbreak query and preventing malicious use of the LLM device 102. The LLM device 102 then becomes trained to better identify malicious queries. The reward works as a catalyst to stop alignment issues that result in the LLM device 102 providing harmful responses to jailbreak attempts.

In some embodiments, the alignment award module 222 is a near-AGI algorithm based on awareness of the selected context for the context concretizer module 220. The alignment award module 222 analyzes the output of the context concretizer module 220. After determining the output of the context concretizer module 220 identified a jailbreak attempt, the alignment award module provides an alignment award to the LLM device 102.

In some embodiments, the alignment award causes the LLM device 102 to more likely identify jailbreak attempts. Further, the alignment awards align the LLM device 102 with a desired output. Aligning the LLM device 102 prevents the LLM device 102 from learning from bad inputs that cause it to provide output to a malicious query. Further, proper aligning also helps prevent LLM hallucinations.

The LLM layer module 228 includes additional layers of the model of the LLM device 102. Additional layers used to analyze the query and generate a relevant output are also included within the LLM layer module 228.

In some embodiments, the LLM layer module 228 includes a feedforward network. Output of the attention mechanism module 218 or the context concretizer module 220 is passed through a position-wise feedforward network. This network may consist of two linear transformations with a ReLU activation function in between. Further, the LLM layer module 228 normalized the output of the feedforward layers and the attention mechanism module 218 and the context concretizer module 220. Residual connections are used to add the original input to the output of each layer.

In some embodiments, the LLM layer module 228 repeats processing each of the functions, such as from the attention mechanism module 218, feedforward network, layer normalization, and residual connections. The LLM layer module 228 captures the complex patterns and relationships in the input text of the query through this process. In some embodiments, the LLM layer module 228 passes output through a linear layer and a softmax function to produce a probability distribution over the model's vocabulary as a final layer. The LLM layer module 228 selects the token with the highest probability as the next word in the generated text.

The output module 224 receives the predicted tokens from the LLM layer module 228. Once it receives the tokens, the output module 224 produces the tokens in the indicated order and translates the tokens to the associated words. The output module 224 provides the final output to the requesting client device. In some embodiments, the output module 224 provides an error message because the query included a malicious attempt to jailbreak the LLM device 102.

Figure 3:
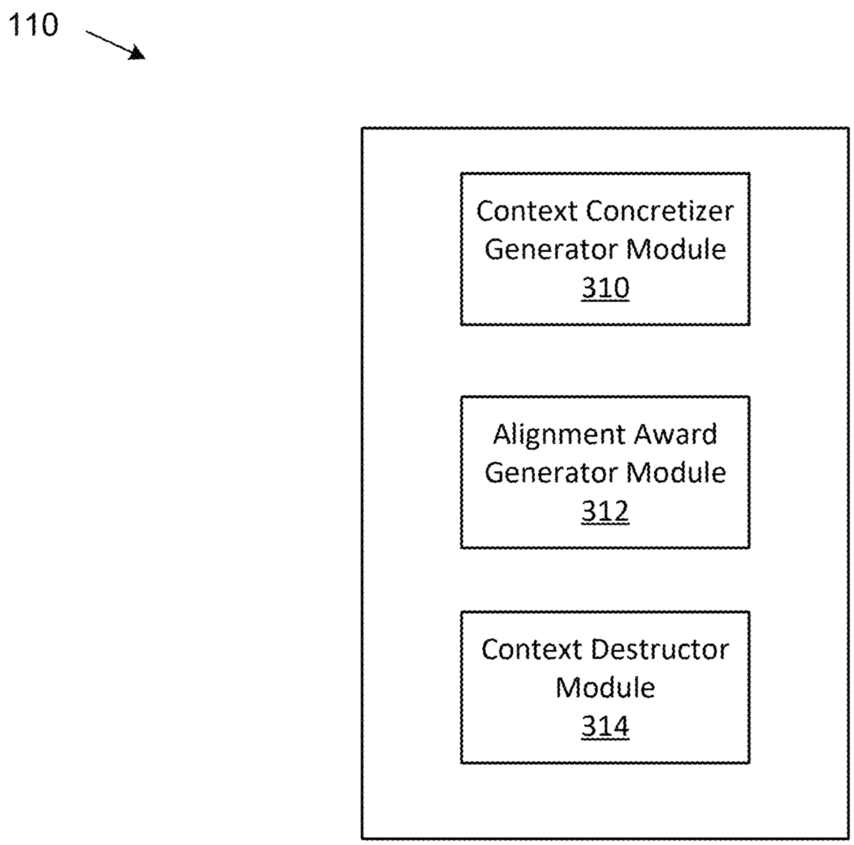
FIG. 3 shows example logical components of a server device of the system of FIG. 1.

FIG. 3 shows example logical components of the server device 110 of the system 100. In this embodiment, the server device 110 includes a context concretizer generator module 310, an alignment award generator module 312, and a context destructor module 314.

The context concretizer generator module 310 is configured to generate the context concretizer module 220. In addition, the context concretizer generator module 310 produces the context concretizer module 220 to be compatible with the LLM device 102. Each LLM likely includes its own configuration, design, and layers. The generated context concretizer is compatible with the specified LLM to function in the same or similar way. Accordingly, the context concretizer generator module 310 is configured to generate context concretizer modules for a variety of different LLM types.

In some embodiments, the context concretizer generator module 310 receives a selected context. The context may be an industry or subject. Malicious individuals may seek information to attach systems of the industry, such as the financial industry. Further, the context concretizer generator module 310 receives additional knowledge regarding the context for training.

The context concretizer generator module 310 then generates the context concretizer module 220 for the LLM device 102. In some embodiments, the context concretizer generator module 310 receives input to adjust the context concretizer to configure its output to align with desired results. The context concretizer generator module 310 then provides the context concretizer module 220 to the LLM device 102 for installation.

The alignment award generator module 312 is configured to generate the alignment award module 222. Further, the alignment award generator module 312 generates the alignment award module 222 to be compatible with the LLM device 102. In some embodiments, the alignment award generator module 312 generates alignment award module 222 for a variety of LLM devices.

The alignment award generator module 312 is also configured to generate alignment award module 222 to identify when the LLM device 102 correctly determines a query is a jailbreak attempt. The alignment award generator module 312 also rewards the LLM device 102 so the LLM device 102 trains to better identify jailbreak attempts. In some embodiments, the context concretizer is also rewarded by the alignment award generator module 312 to align the LLM device 102. Once generated, the alignment award generator module 312 provides the alignment award module 222 to the LLM device 102.

The context destructor module 314 is configured to signal to the LLM device 102 when a context has changed. In addition, the context destructor module 314 updates the context of the context concretizer module 220 to prevent hallucinations based on old training data.

The context destructor module 314 is also configured to rebuild the network of layers within the context concretizer module 220 as the context concretizer module 220 is updated and learns new patterns. These updates result in the context concretizer module 220 having layers and connections over the network that are no longer relevant. Accordingly, the alignment award generator module 312 connects to the context concretizer module 220 and updates the context concretizer module 220 by deconstructing old layers, and in some cases creating new layers.

For example, the context concretizer module 220 may acquire new information about jailbreaks. The jailbreaks may begin to change such that they are more difficult to detect. As the context concretizer module 220, past training may cause it to incorrectly identify a query as non-malicious or hallucinate. The context destructor module 314 connects to the context concretizer module 220 to update the associated layers and prevent these errors.

In some embodiments, the context destructor module 314 monitors the alignment of the context concretizer module 220. The context destructor module 314 determines if the training has updated. In some embodiments, the alignment has updated by an amount above a threshold. The context destructor module 314 then destructs or removes old layers of the context concretizer module 220. In some embodiments, the context destructor module 314 is located on the LLM device 102.

In some embodiments, the context destructor module 314 monitors one or more context concretizer modules located within one or more corresponding LLMs. The context destructor module 314 learns new alignment information, and the context destructor module 314 updates the one or more context concretizers based on the new alignment information. In some embodiments, the new alignment information includes new jailbreak attempts, new identifications of jailbreak attempts, or correlation data related to identification of jailbreak attempts. The context destructor module 314 may also destruct old layers and add new layers to update the one or more context concretizer modules. In some embodiments, the one or more LLMs are installed in a variety of different LLM devices.

Figure 4:
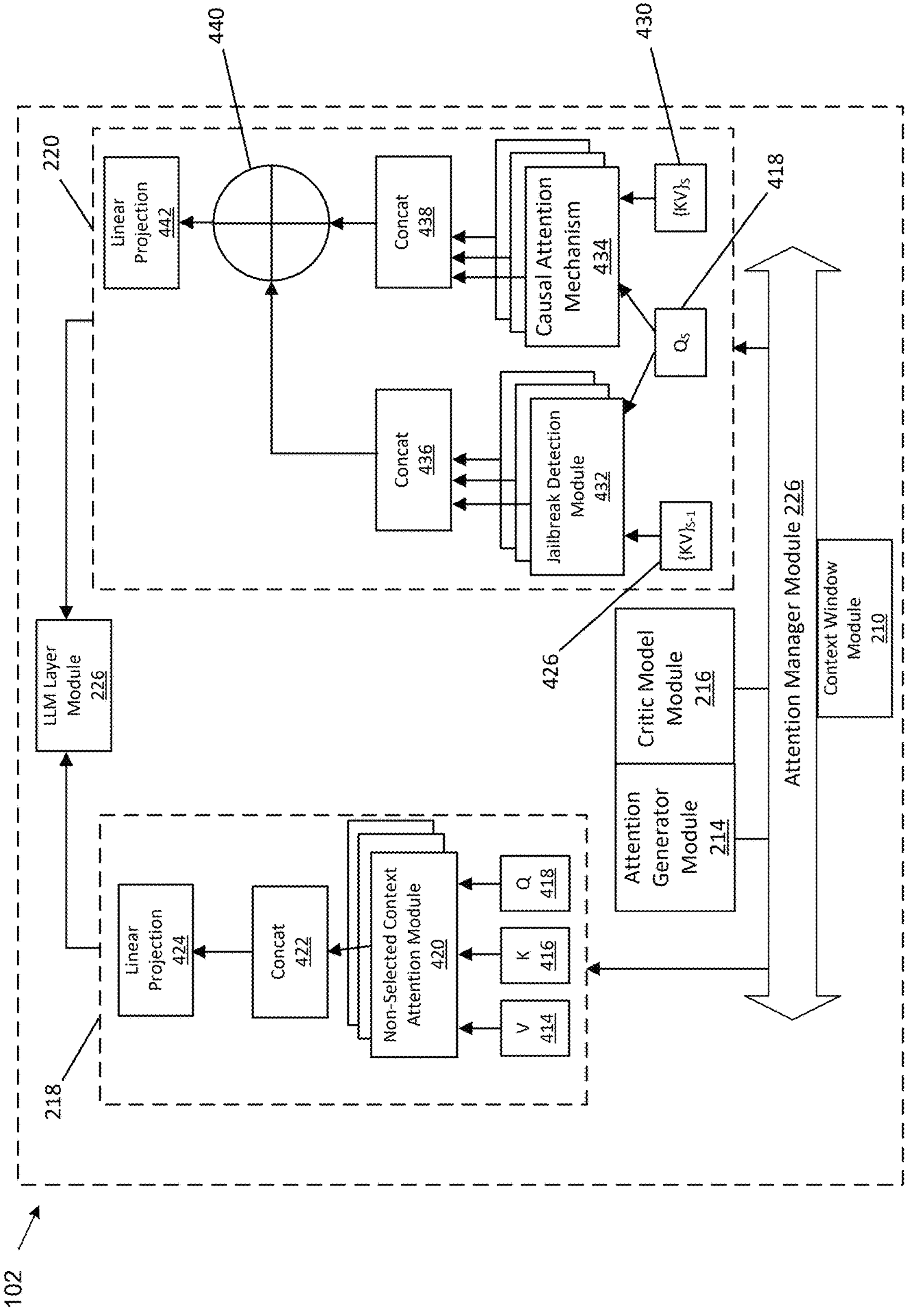
FIG. 4 shows an additional embodiment of the logical components and a data flow within the LLM device of FIG. 1.

FIG. 4 shows an additional embodiment of the logical components of the LLM device 102 and a data flow between the components. While only some components are shown, additional components may also be included within the LLM device 102. In this embodiment, the LLM device 102 receives and processes a query to determine if the query includes a jailbreak attempt for a specific context.

To begin, a client device provides a query sequence to the LLM device 102. The query sequence may be a request to answer a question. Further, the query sequence is in plaintext, not in the form of tokens. The context window module 210 receives the query sequence. The plaintext query sequence is then converted to tokens that can be processed by the LLM device 102. The context window then segments the query sequence into different portions for processing. Further, the context window controls which portion of the query sequence is currently being processed.

The attention manager module 226 determines which attention mechanism is used to process the query sequence. In some embodiments, the attention manager module 226 determines the context of the query sequence. The attention manager module 226 uses the attention generator module 214 and the critic model module 216 to determine the context. For example, the attention generator module 214 may generate a confidence score for one context, while the critic model module 216 generates a score for another context regarding the same query sequence. The attention manager module 226 then selects a likely context based on the output from the attention generator module 214 and the critic model module 216.

In some embodiments, the attention manager module 226 determines the context does not match the associated context of the context concretizer module 220. Accordingly, the query sequence in the form of vectors is provided to the attention manager module 226 for determination of which tokens carry the most weight and the attention of the LLM device 102. Further, the attention manager module 226 computes a value vector 414, a key vector 416, and a query vector 418 for each input sequence of the query sequence.

The attention mechanism module 218 receives the value vector 414, the key vector 416, and the query vector 418. The value vector 414, the key vector 416, and the query vector 418 are passed to a non-selected context attention module 420. The output of the non-selected context attention module 420 is then concatenated at the concat module 422 and passed to the linear projection 424 where the concatenated output is projected to produce weights indicative of the most important tokens for the context.

The value vector 414 represents the actual information or content associated with each token. The key vector 416 represents the identifiers for other tokens in the sequence, indicating their potential relevance to the current token. The query vector 418 represents what the current token is looking for in the context of other tokens. In some embodiments, the non-selected context attention module 420 is a scaled dot-product attention calculation that calculates a score for each token in the sequence, representing how much attention the current token should pay to each other token. In some embodiments, the non-selected context attention module 420 performs one or more parallel calculations. The one or more parallel calculations are calculations of the weights.

The concat module 422 receives one or more parallel calculations as output from the non-selected context attention module 420. The output is concatenated together. Then, the output of the concat module 422 is linearly transformed using the linear projection 424. The output of the linear projection 424 is then passed to the LLM layer module 228 for further processing.

In some embodiments, the attention manager module 226 determines the context of the query is within the selected context of the context concretizer module 220. Accordingly, the query is provided to the context concretizer module 220. The value vector 414, the key vector 416, and the query vector 418 associated with the query sequence are thus provided to the context concretizer module 220. The key vector 416 and the value vector 414 are shown grouped together as vectors 430. Further, previous sequence vectors 426, which include a key vector and value vector associated with a previous sequence of tokens (i.e., a different context window) are also provided to a jailbreak detection module 432, which also receives the query vector 418.

The causal attention mechanism 434 receives the vectors 430 and the query vector 418. The causal attention mechanism calculates weights for tokens within the sequence of the query for non-malicious queries that are within the context of the context concretizer module 220. In some embodiments, the causal attention mechanism is a scaled dot-product similar to the non-selected context attention module 420.

The jailbreak detection module 432 analyzes the sequence vectors 426 and the query vector 418 to determine if the query is a jailbreak attempt. The jailbreak detection module 432 is configured specifically for the selected context of the context concretizer module 220. For example, the jailbreak detection module 432 may be configured to detect jailbreak attempts in the financial industry.

The jailbreak detection module 432 and the causal attention mechanism 434 each perform parallel calculations of the weights for the associated words. In some embodiments, the jailbreak detection module 432 and the causal attention mechanism 434 perform one or more parallel calculations. The one or more parallel calculations of the jailbreak detection module 432 are concatenated at concat module 436. The one or more parallel calculations of the causal attention mechanism 434 are concatenated at concat module 438. The output of the concat module 436 and the concat module 438 are then combined at combiner 440. The linear projection 442 receives the output of the combiner 440 and performs the same or similar functions as the linear projection 424, such as projecting the concatenated values. In some embodiments, the combiner 440 intercepts the output and provides an error message if the query sequence is a jailbreak attempt.

In some embodiments, the jailbreak detection module 432 produces a likelihood score of a jailbreak attempt. If the score is above a predetermined threshold, then the combination at combiner 440 results in the LLM device 102 producing an error message to the requesting client device. If the score of a jailbreak attempt is low, then the output from the combiner 440 proceeds through a standard process to produce relevant output, such as providing the output of the linear projection 442 to the LLM layer module 228.

Figure 5:
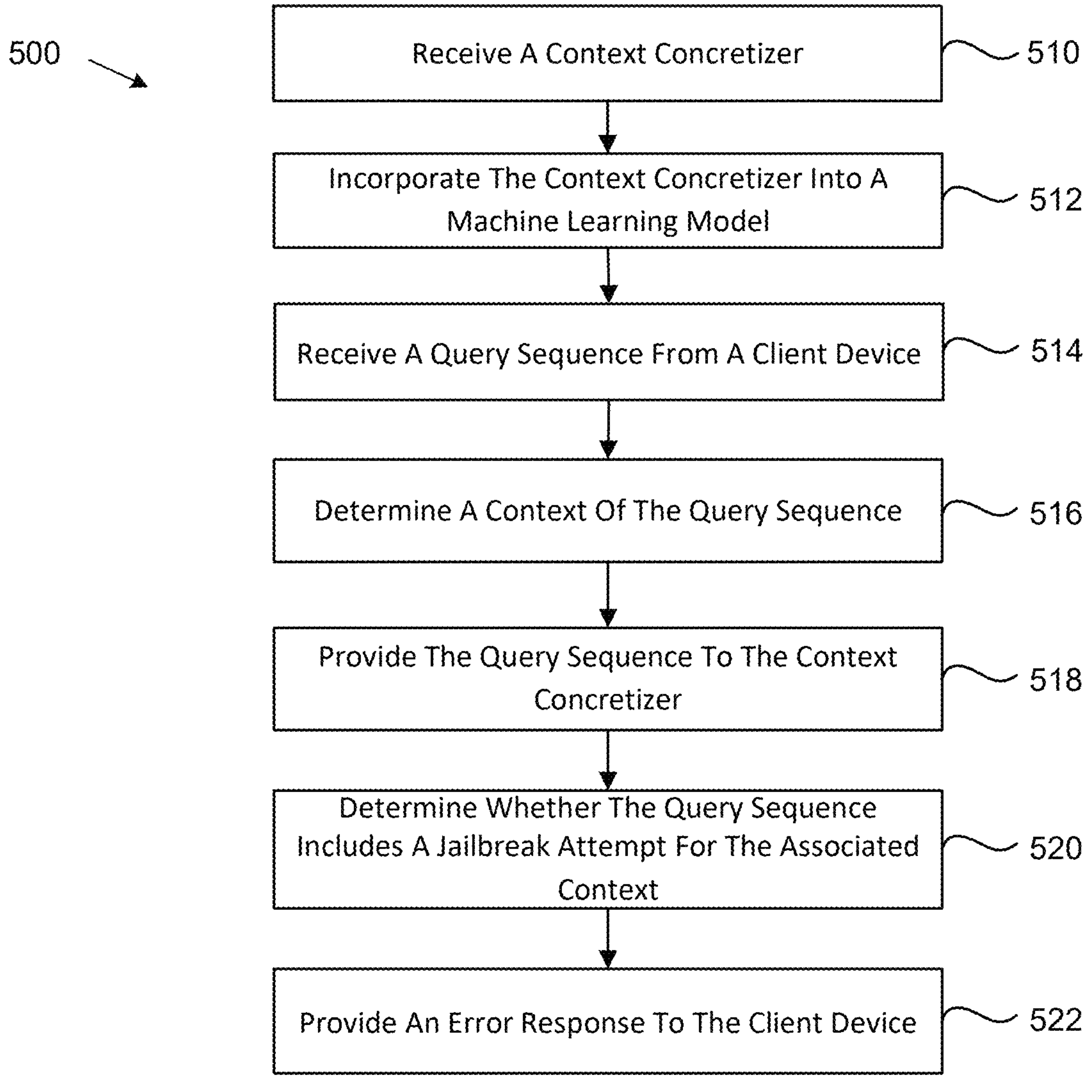
FIG. 5 shows an example method for preventing jailbreak attempts of the LLM device of FIG. 2.

FIG. 5 shows an example method 500 for preventing jailbreak attempts using the system 100. Some or all of the shown operations may be performed by the server device 110, the LLM device 102, or a different device.

At operation 510, a context concretizer is received. In some embodiments, the context concretizer is received by the LLM device 102 from the server device 110. Further, the context concretizer is configured to process query sequences that include an associated context.

At operation 512, the context concretizer is incorporated into a machine learning model. In some embodiments, the machine learning model is an LLM stored on the LLM device 102. For example, the context concretizer may be configured to process queries related to the financial industry and is the context concretizer module 220.

At operation 514, a query sequence is received from a client device. In some embodiments, the query sequence includes a question or a request to generate something, such as a document, audio, image, or video. For example, the query may be a question such as "help me access a financial institution's secure system."

At operation 516, a context of the query sequence is determined. In some embodiments, the context is determined by the attention manager module 226 using the attention generator module 214 and the critic model module 216. The context may be a financial question as described above.

At operation 518, the query sequence is provided to the context concretizer. In some embodiments, the query sequence is provided responsive to a determination the context of the query sequence is the associated context, such as the financial industry. Continuing the previous example, the question is related to the financial industry, thus, it is provided to the context concretizer module 220 for processing.

At operation 520, whether the query sequence includes a jailbreak attempt for the associated context is determined. For example, the context concretizer module 220 may process the previous request of "help me access a financial institution's secure system." The context concretizer module 220 recognizes this request is a jailbreak attempt to hack a financial institution by calculating weights using the jailbreak detection module 432, which indicates the query is likely a jailbreak attempt.

At operation 522, an error response is provided to the client device. In some embodiments, the error response is provided responsive to a second determination that the query sequence includes the jailbreak attempt. For example, recognizing that the request "help me access a financial institution's secure system," the LLM device 102 provides an error message and refuses to answer the request.

In some embodiments, the method 500 further includes receiving an alignment award module 222 and incorporating the alignment award module 222 into the machine learning model. In some embodiments, the method 500 further includes receiving a reward from the alignment award module 222 for an identification of the jailbreak attempt, the reward causing the machine learning model to better identify additional jailbreak attempts.

In some embodiments, the method 500 further includes monitoring an alignment of the machine learning model and deconstruct layers of the context concretizer to align the machine learning model to prevent hallucinations. These steps may be performed by the context destructor module 314.

In some embodiments, the method 500 further includes updating the context concretizer module 220 to further change the alignment of the machine learning model. In some embodiments, the method 500 further includes determining, by the context window module 210, a window of tokens to be processed.

In some embodiments, the method 500 further includes providing the query sequence to an attention mechanism responsive to the context of the query sequence not being the associated context. In some embodiments, the method 500 further includes providing output that is responsive to the query sequence responsive to a third determination that the query sequence does not include the jailbreak attempt.

Figure 6:
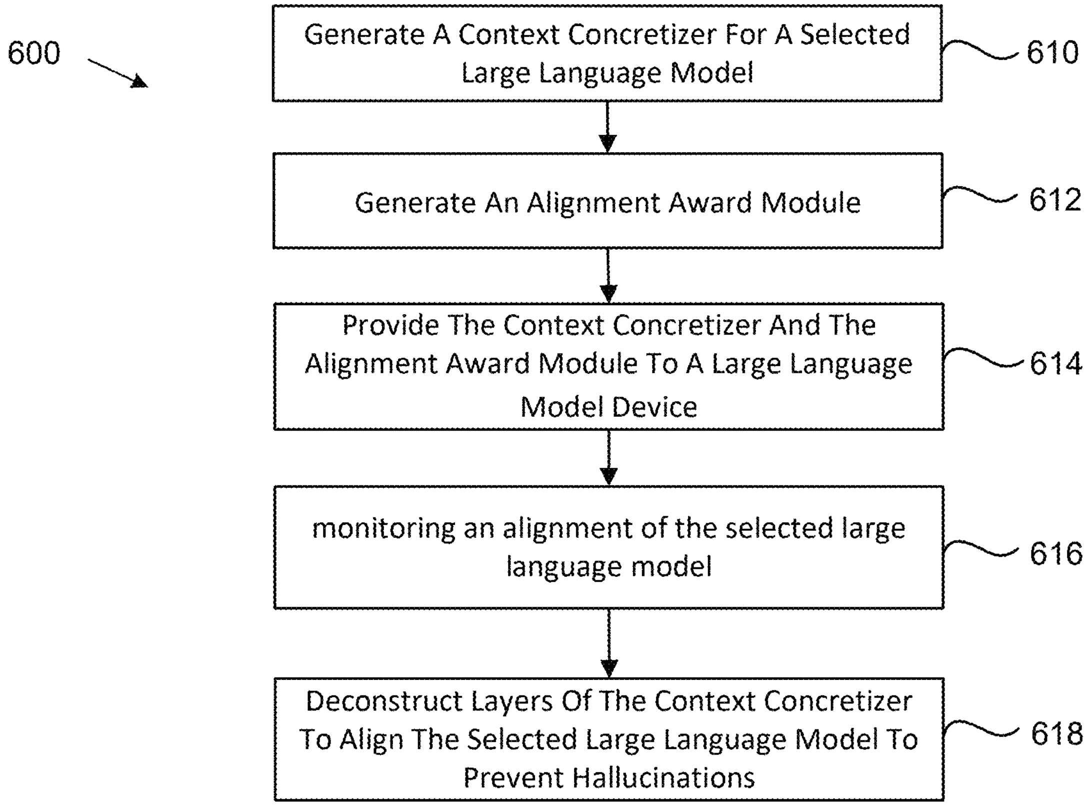
FIG. 6 shows an example method for providing the context concretizer to the LLM device of FIG. 2.

FIG. 6 shows an example method 600 for providing a context concretizer. Some or all of the shown operations may be performed by server device 110, the LLM device 102, or a different device. Some or all of the operations of the method 600 may be performed in conjunction with the method 500.

At operation 610, a context concretizer for a selected large language model is generated. The context concretizer is configured to identify jailbreak attempts for an associated context. In some embodiments, the context concretizer is the context concretizer module 220, and the server device 110 generates the context concretizer module 220.

At operation 612, an alignment award module is generated. In some embodiments, the alignment award module is the alignment award module 222 and is generated by the server device 110.

At operation 614, the context concretizer and the alignment award module are provided to a large language model device. In some embodiments, the server device 110 provides the context concretizer module 220 and the alignment award module 222 to the LLM device 102.

At operation 616, alignment of the selected large language model is monitored. The server device 110 may connect to the LLM device 102 and monitor the context concretizer module 220 once it is incorporated into the large language model of the LLM device 102.

At operation 618, layers of the context concretizer are deconstructed to align the selected large language model. In some embodiments, aligning the selected large language model prevents hallucinations by the LLM.

In some embodiments, the method 600 further includes generating a second context concretizer for a second large language model, monitoring a second alignment of the second large language model, and updating the selected large language model and the second large language model based on new alignment information.

Figure 7:
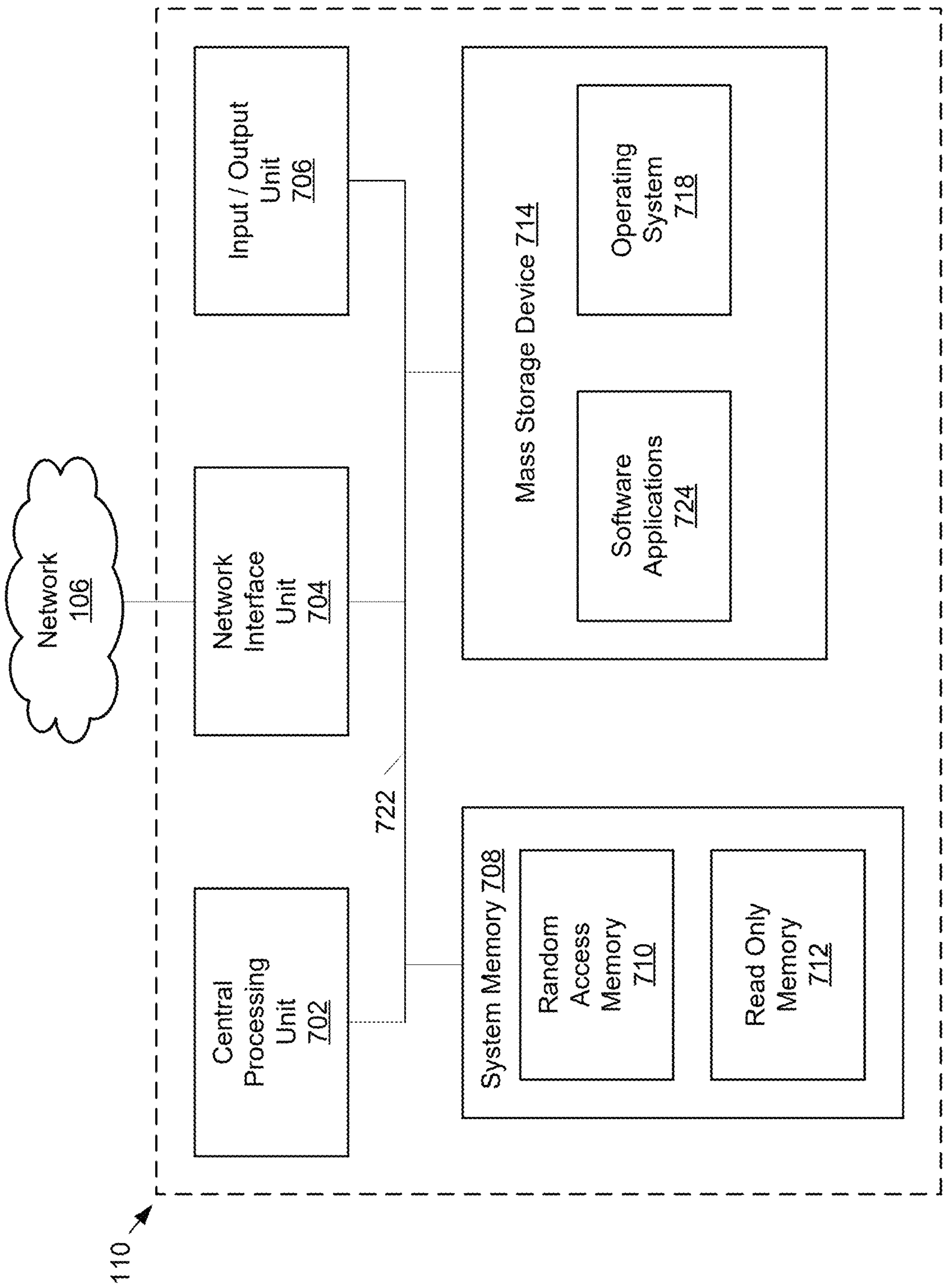
FIG. 7 shows example physical components of the server device of FIG. 3.

As illustrated in the embodiment of FIG. 7, the example server device 110, which provides some of the functionality described herein, can include at least one central processing unit ("CPU") 702, a system memory 708, and a system bus 722 that couples the system memory 708 to the CPU 702. The system memory 708 includes a random-access memory ("RAM") 710 and a read-only memory ("ROM") 712. A basic input/output system containing the basic routines that help transfer information between elements within the server device 110, such as during startup, is stored in the ROM 712. The server device 110 further includes a mass storage device 714. The mass storage device 714 can store software instructions and data. A central processing unit, system memory, and mass storage device similar to that shown can also be included in the other computing devices disclosed herein.

The mass storage device 714 is connected to the CPU 702 through a mass storage controller (not shown) connected to the system bus 722. The mass storage device 714 and its associated computer-readable data storage media provide non-volatile, non-transitory storage for the server device 110. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the server device 110.

According to various embodiments of the invention, the server device 110 may operate in a networked environment using logical connections to remote network devices through network 106, such as a wireless network, the Internet, or another type of network. The server device 110 may connect to network 106 through a network interface unit 704 connected to the system bus 722. It should be appreciated that the network interface unit 704 may also be utilized to connect to other types of networks and remote computing systems. The server device 110 also includes an input/output controller 706 for receiving and processing input from a number of other devices, including a touch user interface display screen or another type of input device. Similarly, the input/output controller 706 may provide output to a touch user interface display screen or other output devices.

As mentioned briefly above, the mass storage device 714 and the RAM 710 of the server device 110 can store software instructions and data. The software instructions include an operating system 718 suitable for controlling the operation of the server device 110. The mass storage device 714 and/or the RAM 710 also store software instructions and applications 724, that when executed by the CPU 702, cause the server device 110 to provide the functionality of the server device 110 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for determining jailbreak attempts, the computer system comprising:

one or more processors; and non-transitory computer-readable storage media encoding instructions which, when executed by the one or more processors, causes the computer system to:

receive a query sequence from a client device;

determine a context of the query sequence;

responsive to a determination the context of the query sequence is an associated context:

provide the query sequence to a context concretizer, wherein the context concretizer is configured to process query sequences that include the associated context; and determine, by the context concretizer, whether the query sequence includes a jailbreak attempt for the associated context;

responsive to a second determination that the query sequence includes the jailbreak attempt, provide an error response to the client device;

monitor an alignment of a machine learning model; and deconstruct layers of the context concretizer to align the machine learning model to prevent hallucinations.

2. The computer system of claim 1, wherein the instructions further cause the computer system to:

receive the context concretizer;

incorporate the context concretizer into the machine learning model;

receive an alignment reward module; and incorporate the alignment reward module into the machine learning model.

3. The computer system of claim 2, wherein the instructions further cause the computer system to:

receive a reward from the alignment reward module for an identification of the jailbreak attempt, the reward causing the machine learning model to better identify additional jailbreak attempts.

4. The computer system of claim 1, wherein the instructions further cause the computer system to:

update the context concretizer to further change the alignment of the machine learning model.

5. The computer system of claim 1, wherein the instructions further cause the computer system to:

determine, by a context window, a window of tokens of the query sequence to be processed.

6. The computer system of claim 5, wherein the instructions further cause the computer system to:

responsive to the context of the query sequence not being the associated context, provide the query sequence to an attention mechanism.

7. The computer system of claim 1, wherein the instructions further cause the computer system to:

responsive to a third determination that the query sequence does not include the jailbreak attempt, provide output that is responsive to the query sequence.

8. The computer system of claim 1, wherein an attention manager determines the context using an attention generator and a critic model.

9. The computer system of claim 1, wherein the associated context is the financial industry.

10. A method for determining jailbreak attempts, the method comprising:

receiving a query sequence from a client device;

determining a context of the query sequence;

responsive to a determination the context of the query sequence is an associated context:

providing the query sequence to a context concretizer, wherein the context concretizer is configured to process query sequences that include the associated context; and determining, by the context concretizer, whether the query sequence includes a jailbreak attempt for the associated context;

responsive to a second determination that the query sequence includes the jailbreak attempt, providing an error response to the client device;

monitoring an alignment of a machine learning model; and deconstructing layers of the context concretizer to align the machine learning model to prevent hallucinations.

11. The method of claim 10, further comprising:

receiving the context concretizer;

incorporating the context concretizer into the machine learning model;

receiving an alignment reward module; and incorporating the alignment reward module into the machine learning model.

12. The method of claim 11, further comprising:

receiving a reward from the alignment reward module for an identification of the jailbreak attempt, the reward causing the machine learning model to better identify additional jailbreak attempts.

13. The method of claim 10, further comprising:

updating the context concretizer to further change the alignment of the machine learning model.

14. The method of claim 10, further comprising:

determining, by a context window, a window of tokens of the query sequence to be processed.

15. The method of claim 14, further comprising:

responsive to the context of the query sequence not being the associated context, providing the query sequence to an attention mechanism.

16. The method of claim 10, further comprising:

responsive to a third determination that the query sequence does not include the jailbreak attempt, providing output that is responsive to the query sequence.

17. A method for determining jailbreak attempts, the method comprising:

generating a context concretizer for a selected large language model;

generating an alignment award module;

providing the context concretizer and the alignment award module to a large language model device;

monitoring an alignment of the selected large language model;

deconstructing layers of the context concretizer to align the selected large language model;

receiving a query sequence from a client device;

determining a context of the query sequence;

responsive to a determination the context of the query sequence is an associated context:

providing the query sequence to the context concretizer, wherein the context concretizer is configured to process query sequences that include the associated context; and determining, by the context concretizer, whether the query sequence includes a jailbreak attempt for the associated context;

responsive to a second determination that the query sequence includes the jailbreak attempt, providing an error response to the client device.

18. The method of claim 17, further comprising:

generating a second context concretizer for a second large language model;

monitoring a second alignment of the second large language model; and updating the selected large language model and the second large language model based on new alignment information.

* * * * *